US011391382B2

United States Patent
Ooka

(10) Patent No.: US 11,391,382 B2
(45) Date of Patent: Jul. 19, 2022

(54) DIAPHRAGM FOR VALVE AND DIAPHRAGM VALVE

(71) Applicant: SHINWA CONTROLS CO., LTD, Kawasaki (JP)

(72) Inventor: Hidemitsu Ooka, Kawasaki (JP)

(73) Assignee: Shinwa Controls Co., Ltd, Kawasaki (JP)

( * ) Notice: Subject to any disclaimer, the term of this patent is extended or adjusted under 35 U.S.C. 154(b) by 0 days.

(21) Appl. No.: 17/269,068

(22) PCT Filed: Aug. 29, 2018

(86) PCT No.: PCT/JP2018/031926
§ 371 (c)(1),
(2) Date: Feb. 17, 2021

(87) PCT Pub. No.: WO2020/044456
PCT Pub. Date: Mar. 5, 2020

(65) Prior Publication Data
US 2021/0207723 A1 Jul. 8, 2021

(51) Int. Cl.
*F16K 7/16* (2006.01)
(52) U.S. Cl.
CPC ..................... *F16K 7/16* (2013.01)
(58) Field of Classification Search
CPC ...... F16K 41/103; F16K 41/106; F16K 41/12; F16K 31/0672; F16K 31/402;
(Continued)

(56) References Cited

U.S. PATENT DOCUMENTS 3,784,154 A * 1/1974 Ostrowski ............. F16K 31/404
251/38
5,333,643 A * 8/1994 Gilchrist ............... F16K 41/103
251/129.17
(Continued)

FOREIGN PATENT DOCUMENTS

JP S60-038978 U 3/1985
JP S61-000571 U 1/1986
(Continued)

OTHER PUBLICATIONS

Japanese Office Action (Application No. 2015-027797) dated May 19, 2015 (with English translation).
(Continued)

*Primary Examiner* — Hailey K. Do
(74) *Attorney, Agent, or Firm* — Burr & Brown, PLLC

(57) ABSTRACT

A diaphragm having an outer surface of a bottom wall that closes a cylindrical circumferential wall constituting a main valve disc part forms a contact surface to be in contact with a valve seat. An annular groove is formed in an inner circumferential portion of a membrane part protruding from the circumferential wall. The groove is concaved to the other axial side from the one axial side, and a sectional shape of the groove is arcuate. A surface of the inner circumferential portion and a surface of the outer circumferential portion in the membrane part are coplanar, the surfaces facing the other axial side. An axial thickness of the outer circumferential portion is ⅖-⅗ an axial thickness of the main valve disc part, and a minimum axial thickness of the inner circumferential portion is ¼-⅓ the axial thickness of the outer circumferential portion.

16 Claims, 13 Drawing Sheets

(58) Field of Classification Search
CPC .............. F16K 31/404; F16K 31/365; F16K 31/52491; F16K 27/0236; F16K 7/14; F16K 7/16; F16K 7/17
See application file for complete search history.

(56) References Cited

U.S. PATENT DOCUMENTS

| | | | |
|---|---|---|---|
| 9,964,220 B1* | 5/2018 | Ro | F16K 27/029 |
| 2006/0065868 A1* | 3/2006 | Strong | F16K 31/1221 251/63.5 |
| 2008/0289693 A1* | 11/2008 | Irwin | F16K 31/402 137/12 |
| 2009/0140194 A1* | 6/2009 | Kato | F16K 7/14 251/318 |
| 2015/0323081 A1* | 11/2015 | Hasunuma | F16K 7/16 251/331 |
| 2021/0396328 A1* | 12/2021 | Ichiyama | F16K 31/0672 |

FOREIGN PATENT DOCUMENTS

| | | |
|---|---|---|
| JP | 2014-169725 A1 | 9/2014 |
| JP | 5819550 | 11/2015 |
| JP | 2016-151293 A1 | 8/2016 |

OTHER PUBLICATIONS

International Search Report and Written Opinion (Application No. PCT/JP2018/031926) dated Nov. 27, 2018.
English translation of the International Preliminary Report on Patentability (Chapter I) (Application No. PCT/JP2018/031926) dated Mar. 11, 2021.

* cited by examiner

DIAPHRAGM FOR VALVE AND DIAPHRAGM VALVE

FIELD OF THE INVENTION

The present invention relates to a diaphragm for valve and a diaphragm valve.

BACKGROUND ART

JP2014-169725A for example discloses a diaphragm valve comprising a valve body having a valve seat, a diaphragm as a valve disc member which can be brought into contact with or separated from the valve seat, and a drive unit which can bring the diaphragm into contact with the valve seat and separate the diaphragm from the valve seat.

In the diaphragm valve disclosed in JP2014-169725A, the valve body and the drive unit are coupled by a bolt. However, since a tool for fastening the bolt is needed, an operation for coupling the valve body and the drive unit is complicated.

In consideration of the above problem, JP5819550B of the Applicant of this patent application has proposed a diaphragm valve which utilizes resiliency of a diaphragm and a pin inserted across a valve body and a drive unit, whereby the valve body and the drive unit can be coupled without using any tool.

SUMMARY OF THE INVENTION

The Applicant used a diaphragm 100 shown in FIG. 14 in a diaphragm valve. The diaphragm 100 shown in FIG. 14 comprises a cylindrical main valve disc part 101 which is coupled to a shaft part reciprocated by a drive unit to be brought into contact with a valve seat, and an annular membrane part 102 protruding from an outer circumferential surface of the main valve disc part 101.

The membrane part 102 has an annular outer circumferential part 103 sandwiched between a valve body and a drive unit, and an annular inner circumferential part 104 located between the outer circumferential part 103 and the main valve disc part 101 to couple the outer circumferential part 103 and the main valve disc part 101. In the diaphragm 100, a surface of the outer circumferential part 103 and a surface of the inner circumferential part 104, which are located on the valve seat side in a direction along which a shaft part of the drive unit is reciprocated (referred to as axial direction herebelow), are coplanar with a surface of the main valve disc part 101, which is brought into contact with the valve seat. On the other hand, the inner circumferential part 104 has an annular groove 105 formed therein, which is axially concaved to the valve seat side and extends entirely in the circumferential direction. Thus, a thickness of the inner circumferential part 104 is smaller than a thickness of the outer circumferential part 103.

In the diaphragm 100, since the thickness of the inner circumferential part 104 is smaller than the thickness of the outer circumferential part 103, the inner circumferential part 104 can be easily deformed to have good sensitivity (following property) to the movement of the shaft part of the drive unit. On the other hand, since the surfaces of the outer circumferential part 103 and the inner circumferential part 104, which are located on the valve seat side, are coplanar with the surface of the main valve disc part 101, which is brought into contact with the valve seat, rigidity against a fluid pressure can be ensured to effectively suppress fluid leakage.

In addition, in the diaphragm 100, when the drive unit reciprocates the shaft part, the valve seat is opened or closed by the main valve disc part 101. By forming the diaphragm 100 with a specific rubber material, the applicant has realized durability of the diaphragm 100 which can withstand about 1 million valve seat opening/closing operations.

However, the applicant has found that when the surfaces of the outer circumferential part 103 and the inner circumferential part 104, which are located on the valve seat side, are coplanar with the surface of the main valve disc part 101, the durability may be comprised by a stress on the diaphragm when opening/closing the valve seat.

The present invention has been made by intensive research based on the above findings. The object of the present invention is to provide a diaphragm for valve and a diaphragm valve comprising the same, which can have good sensitivity to an operation of a drive unit and good rigidity to a fluid pressure, while having improved durability as compared with a conventional one.

A diaphragm for valve according to the present invention comprises: a main valve disc part having a cylindrical circumferential wall and a bottom wall that closes the circumferential wall from one axial side, wherein an opening that opens the circumferential wall to the other axial side is formed, the main valve disc part couples to a shaft part that is axially reciprocated by a drive unit in a state where the shaft part is received therein from the opening, and a contact surface to be in contact with a valve seat is formed on an outer surface of the bottom wall, the outer surface facing the one axial side; and an annular membrane part radially protruding from an outer circumferential surface of the main valve disc part.

The membrane part has an annular outer circumferential portion that is sandwiched between a valve body on which the valve seat is formed and a case that constitutes a part of the drive unit and is attached to the valve body while it covers the shaft part, and an annular inner circumferential portion located between the outer circumferential portion and the main valve disc part to couple the outer circumferential portion and the main valve disc part.

An annular groove is formed in the inner circumferential portion, the annular groove being concaved to the other axial side from a boundary between the inner circumferential portion and the outer circumferential portion on the one axial side and a boundary between the inner circumferential portion and the main valve disc part, and extending entirely in a circumferential direction, with a sectional shape of the groove being arcuate, and a surface of the inner circumferential portion and a surface of the outer circumferential portion are coplanar, the surfaces facing the other axial side.

An axial thickness of the outer circumferential portion is between ⅖ or more and ⅗ or less of an axial thickness of the main valve disc part.

A minimum axial thickness of the inner circumferential portion is between ¼ or more and ⅓ or less of the axial thickness of the outer circumferential portion.

An inner circumferential edge of the inner circumferential portion connects to a portion of an outer circumferential surface of the circumferential wall, the portion including an axial midpoint of the outer circumferential surface of the circumferential wall;

a surface of the outer circumferential portion, which faces the one axial side, is located between positions on one axial side and the other axial side, which are apart from the contact surface of the main valve disc part, which faces the one axial side, by a distance of ³⁄₂₀ of the thickness of the outer circumferential portion.

A radial dimension from the inner circumferential edge of the inner circumferential portion to an outer circumferential edge thereof is between 5/10 or more and 7/10 or less of a radial dimension from an inner circumferential edge of the outer circumferential portion to an outer circumferential edge thereof.

The diaphragm for valve is formed of a resilient material.

A diaphragm valve according to the present invention comprises the diaphragm for valve.

The diaphragm valve according to the present invention comprises: a valve body having a first and a second ports through which a fluid flows, a fluid chamber to which the first port and the second port are connected, and a valve seat formed inside the fluid chamber, wherein an opening for exposing the valve seat to an outside is formed in the fluid chamber; said diaphragm for valve according to any of claims 1 to 4, the diaphragm for valve being capable of being brought into contact with or separated from the valve seat; a drive unit that includes a drive part having a reciprocable shaft part to be coupled to the main valve disc part of the diaphragm for valve, and a case that houses the drive part and is disposed to cover the opening, wherein the drive unit switches communication and disconnection between the first port and the second port by bringing the diaphragm for valve into contact with or separating from the valve seat by means of the shaft part; and a pin member for attaching the drive unit to the valve body.

A seal part is formed on an outer circumferential edge of the opening in the fluid chamber, a first attachment wall part projecting to surround the opening is formed on an outer circumferential-side portion of the seal part, and a second attachment wall part is formed on an end of the case on the opening side, the second attachment wall part projecting to surround the shaft part and being disposed on an inner circumferential side of the first attachment wall part.

A first attachment hole to which the pin member is inserted is formed in the first attachment wall part, a second attachment hole to which the pin member is inserted is formed in the second attachment wall part, and the drive unit is attached to the valve body by inserting the pin member across the first attachment hole and the second attachment hole.

The outer circumferential portion of the membrane part of the diaphragm for valve is sandwiched between the second attachment wall part and the seal part.

The pin member is inserted across the first attachment hole and the second attachment hole in a state where the second attachment wall part compresses the outer circumferential portion between the second attachment wall part and the seal part to the valve body, and the compressed outer circumferential portion urges the case in a direction away from the valve body, so that the pin member is pressed onto an inner circumferential surface of the first attachment hole.

The present invention can provide a diaphragm which can have good sensitivity to an operation of a drive unit and good rigidity to a fluid pressure, while having improved durability as compared with a conventional one.

DETAILED DESCRIPTION OF THE INVENTION

Figure 1:
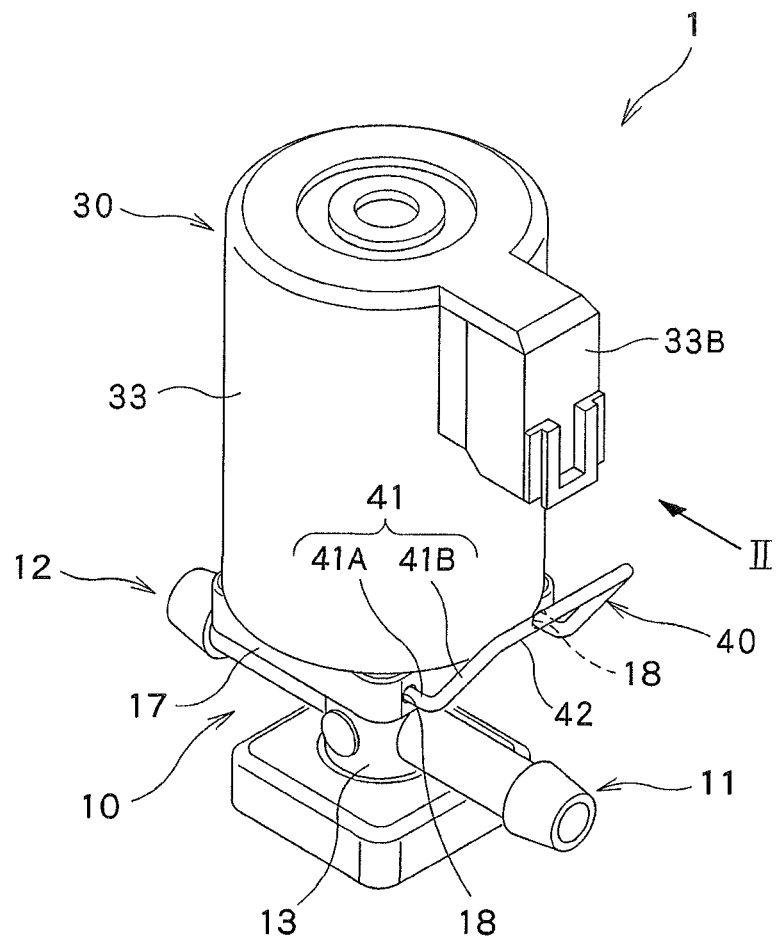
FIG. 1 is a perspective view of a diaphragm valve according to an embodiment of the present invention.
Figure 2:
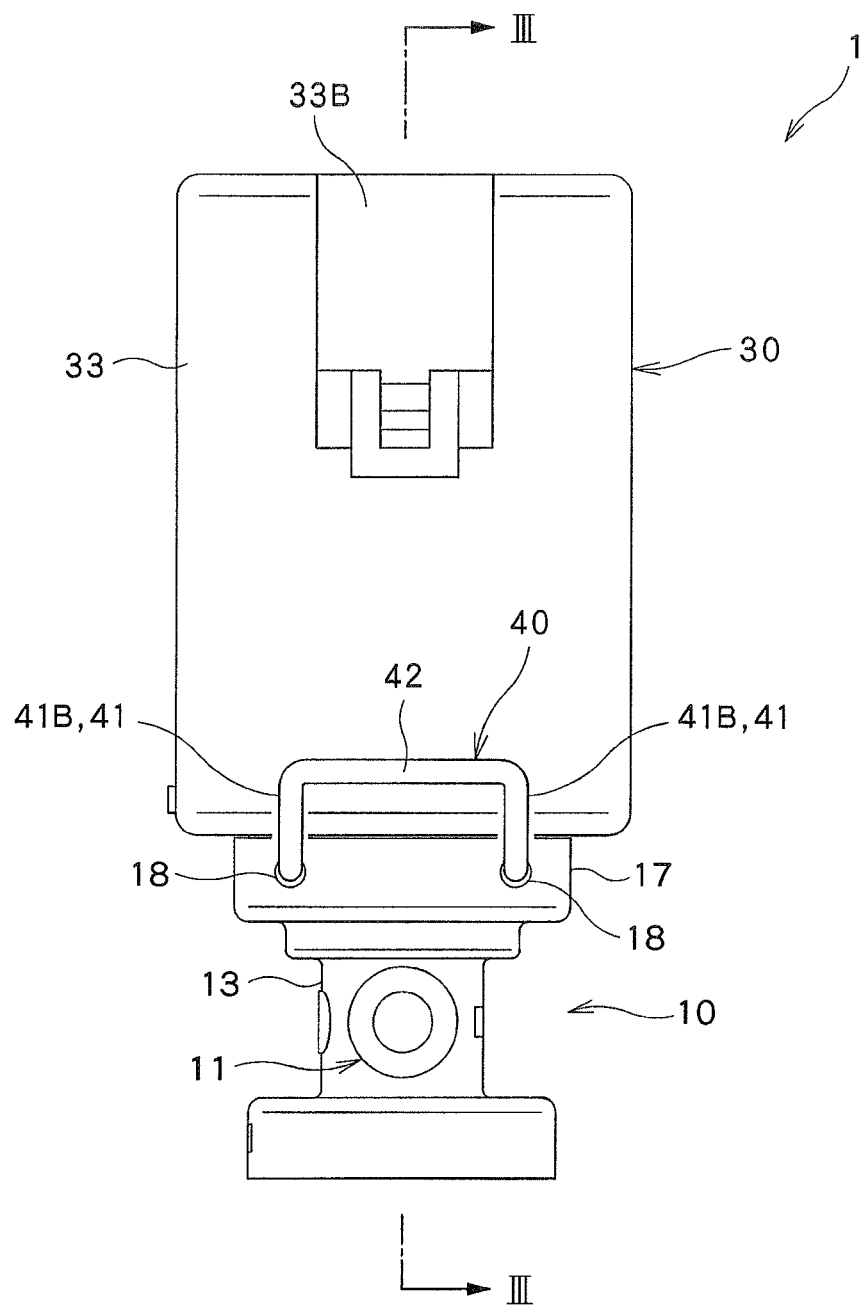
FIG. 2 is a side view of the diaphragm valve seen along a direction of an arrow II of FIG. 1.
Figure 3:
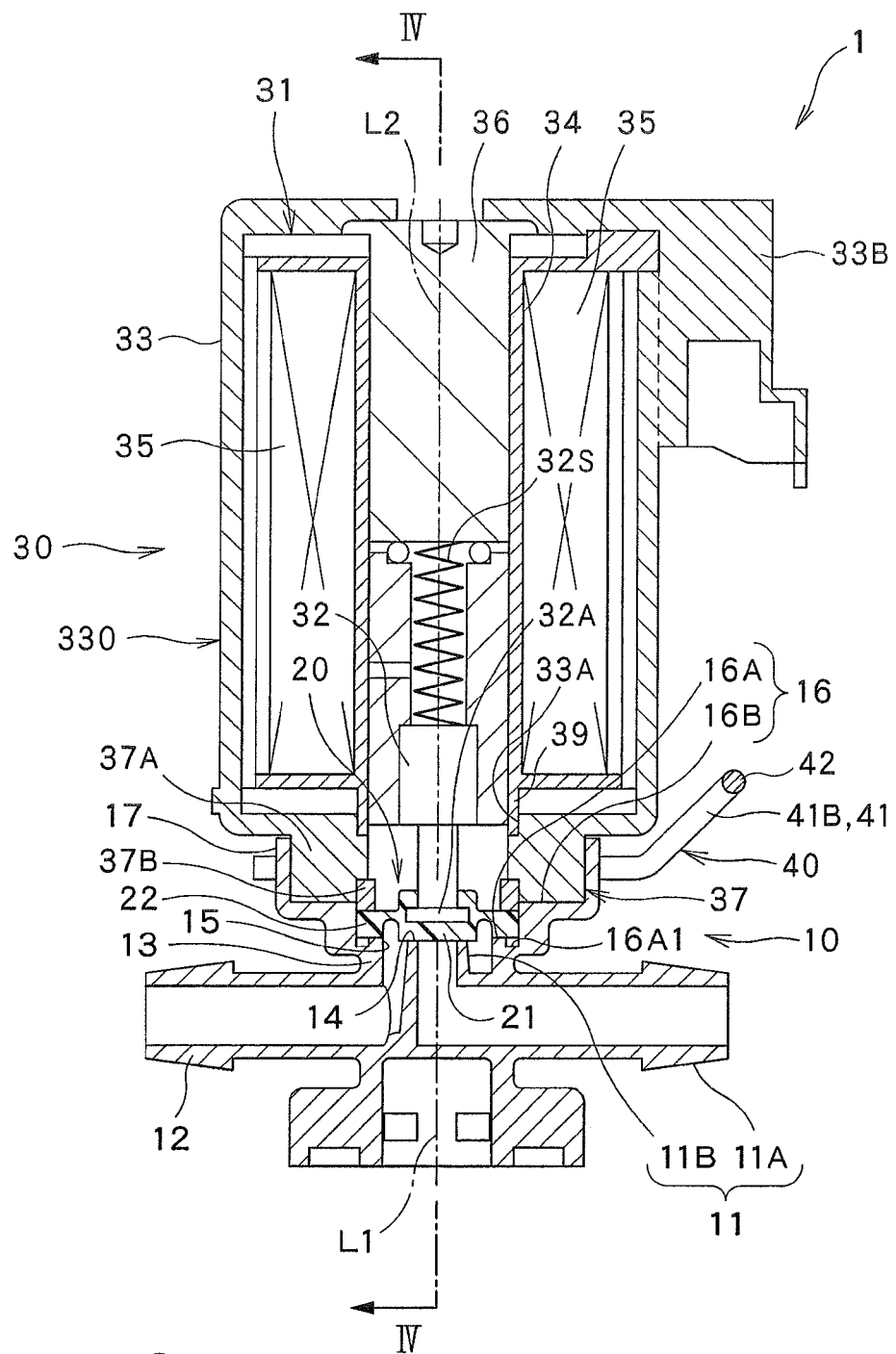
FIG. 3 is a sectional view along a III-III line of FIG. 2.
Figure 4:
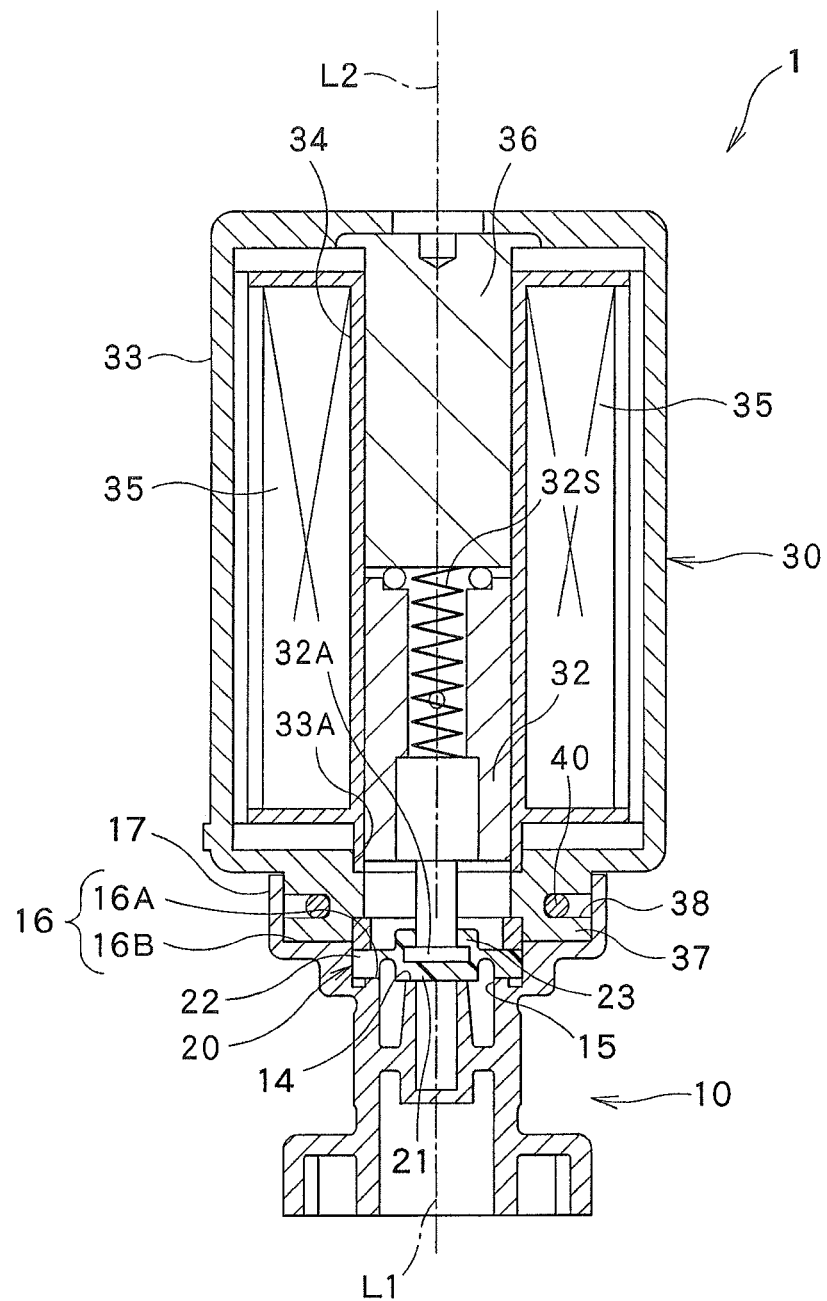
FIG. 4 is a sectional view along a IV-IV line of FIG. 3.
Figure 5:
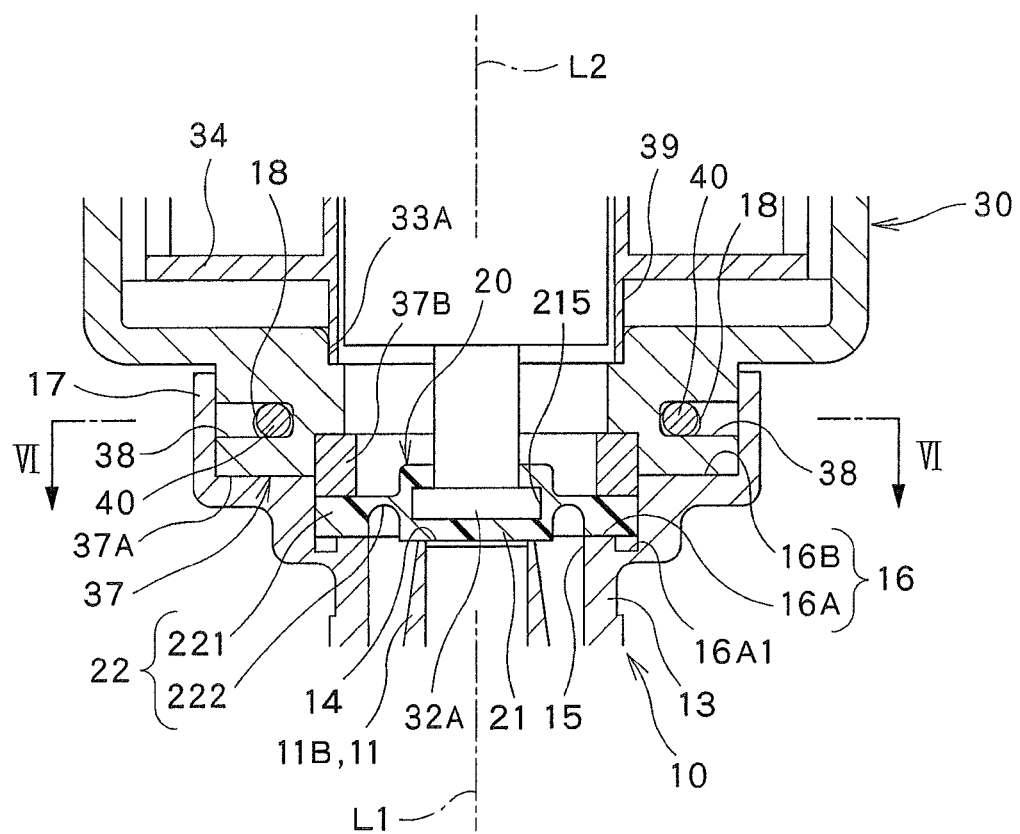
FIG. 5 is an enlarged view of FIG. 4.
Figure 6:
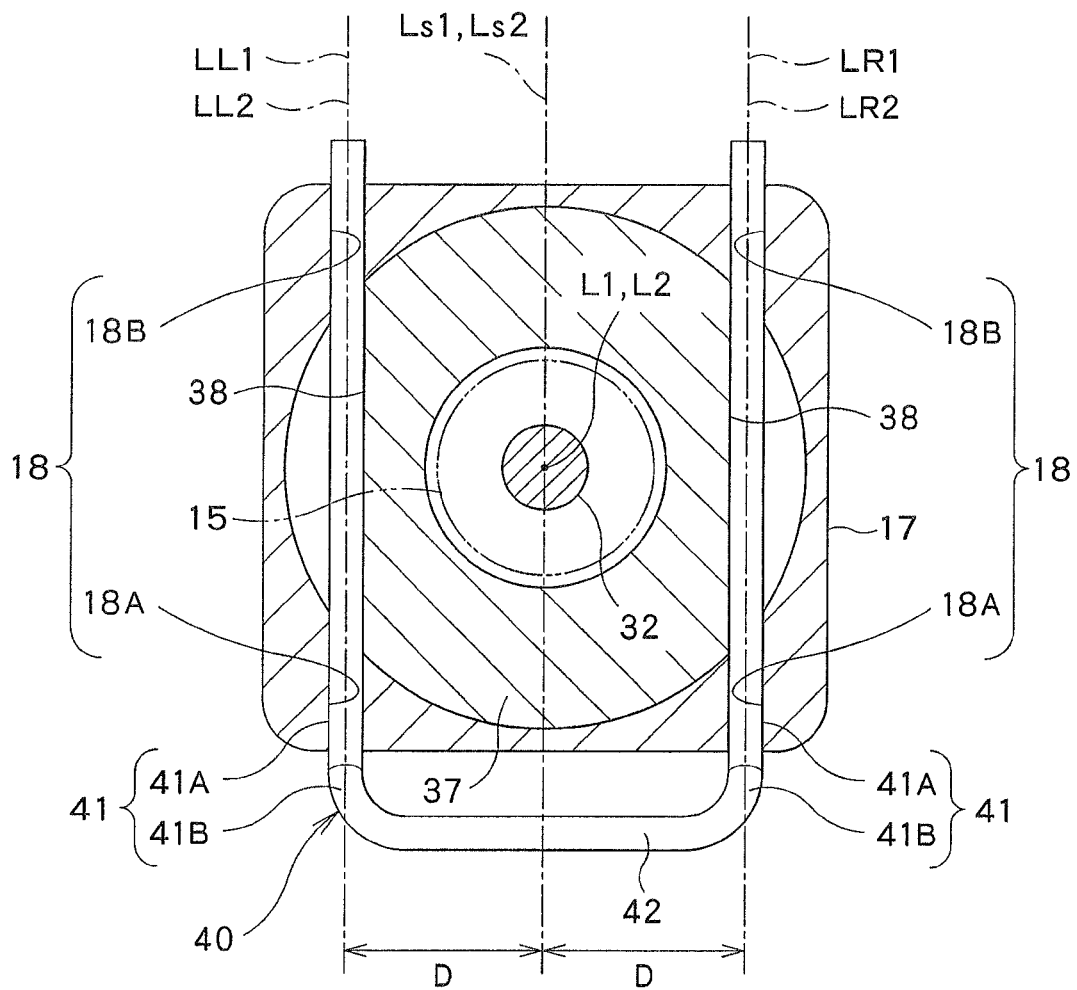
FIG. 6 is a sectional view corresponding to a VI-VI line of FIG. 5.
Figure 7:
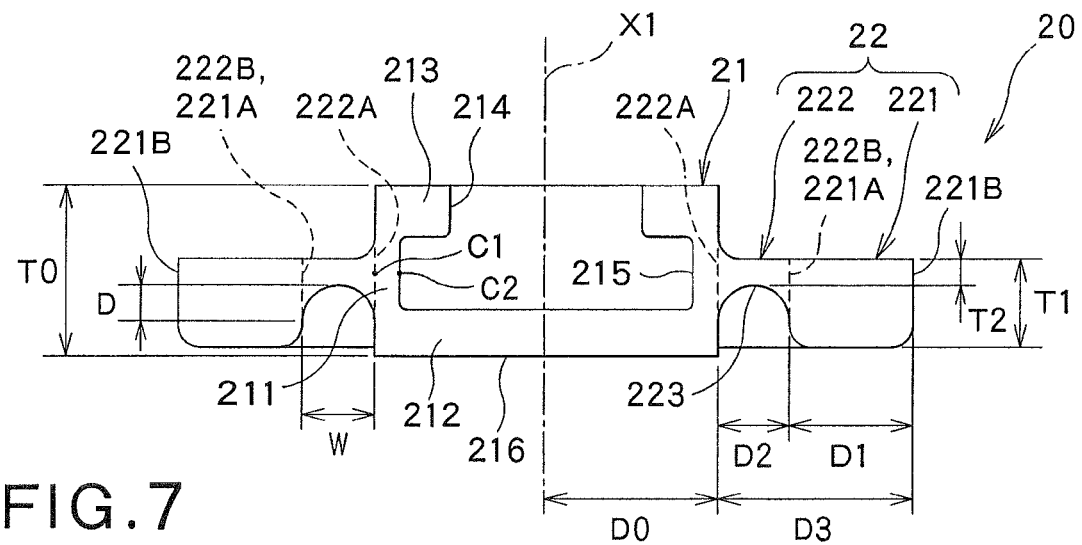
FIG. 7 is a sectional view of a diaphragm provided on the diagraph valve shown in FIG. 1.

Herebelow, an embodiment of the present invention is described. FIG. 1 is a perspective view of a diaphragm valve 1 according to an embodiment of the present invention. FIG. 2 is a side view of the diaphragm valve 1 seen along a direction of an arrow II of FIG. 1. FIG. 3 is a sectional view along a III-III line of FIG. 2. FIG. 4 is a sectional view along a IV-IV line of FIG. 3. FIG. 5 is an enlarged view of FIG. 4. FIG. 6 is a sectional view corresponding to a VI-VI line of FIG. 5. FIG. 7 is a sectional view of a diaphragm 20 provided on the diagraph valve 1 shown in FIG. 1.

As shown in FIGS. 1 to 4, the diaphragm valve 1 according to this embodiment comprises a valve body 10, a diaphragm 20 which is a valve disc member, a drive unit 30, and a pin member 40. In the diaphragm valve 1, the drive unit 30 is attached to the valve body 10 by the pin member 40 inserted across the valve body 10 and the drive unit 30. Structures of the respective parts of the diaphragm valve 1 are described in detail below.

(Valve Body)

The valve body 10 has a first port 11 through which a fluid flows, a second port 12 through which the fluid flows, a fluid chamber 13 to which the first port 11 and the second port 12 are connected, and a valve seat 14 formed inside the fluid chamber 13. As shown in FIG. 3, the first port 11 has an outer tube part 11A and an inner tube part 11B which are communicated with each other. The outer tube part 11A and the inner tube part 11B are coupled to each other in an L shape. The outer tube part 11A is connected to the fluid chamber 13 to pass through the fluid chamber 13. The inner tube 11B is bent from an end of the outer tube part 11, which is inside the fluid chamber 13. A distal end of the inner tube 11B opens inside the fluid chamber 13. In this embodiment, the aforementioned valve seat 14 is formed in an opening end of the inner tube part 11B of the first port 11. Note that the form or the shape of the valve seat 14 is not particularly limited.

The second port 12 is formed linearly. Similar to the first port 11, the second port 12 opens inside the fluid chamber 13.

As shown in FIGS. 1 and 3, in this embodiment, the first port 11, in particular, its outer tube part 11A, and the second port 12 are connected to the fluid chamber 13 in such a manner that they extend collinearly. Pipe members, not shown, are connected to the respective ends of the first port 11 and the second port 12, which are located outside the fluid chamber 13.

The fluid chamber 13 has a cylindrical shape. The fluid chamber 13 has an opening 15 for exposing the valve seat 14 to the outside, at its one axial end part, more specifically, in an inner circumferential surface of the one axial end part. In this example, the opening 15 is formed to have a circular shape. A symbol L1 in the drawings depicts a center axis line of the opening 15. As shown in FIG. 5, the opening 15, which is formed in the fluid chamber 13, is located outside the valve seat 14, which formed in the opening end of the inner tube part 11B of the first port 11, in the direction of the center axis line L1. Thus, the opening 15 in this embodiment is opposed to the valve seat 14. In this example, although the opening 15 has a circular shape, it may have another shape such as a polygonal shape. In addition, although the fluid chamber 13 has a cylindrical shape, it may have another shape having, e.g., a rectangular cross-sectional shape. The opening 15 may be located at the same position as the valve seat 14 in the direction of the center axis line L1. Alternatively, the valve seat 14 may be located outside the opening 15 in the direction of the center axis line L1.

A seal part 16 is formed on an outer circumferential edge of the opening 15 in the fluid chamber 13. In this embodiment, the seal part 16 is formed like a flange. The seal part 16 has an inner seal part 16A located on an inner circumferential side, and an outer seal part 16B located on an outer circumferential side. The outer seal part 16B projects outside from the inner seal part 16A in the direction of the center axis line L1. The aforementioned diaphragm 20 is placed on the inner seal part 16A.

In this embodiment, as shown in FIG. 5, an annular groove 16A1 is formed in an outer circumferential portion of the inner seal part 16A. The diaphragm 20 is in contact with an inner circumferential portion of the inner seal part 16A and is floating from the outer circumferential portion in which the groove 16A1 is formed.

A first attachment wall part 17 projecting to surround the opening 15 is formed on an outer circumferential-side portion of the outer seal part 16B. In this embodiment, the first attachment wall part 17 is formed to entirely surround the opening 15. When seen in the direction of the center axis line L1 of the opening 15, the first attachment wall part 17 has a substantially rectangular outer circumferential surface, and a circular inner circumferential surface (see FIGS. 1 and 6). The first attachment wall part 17 has a first attachment hole 18 to which the aforementioned pin member 40 is inserted.

FIG. 6 is a sectional view along the VI-VI line of FIG. 5. As shown in FIG. 6, in this embodiment, the first attachment hole 18 is formed to pass through the first attachment wall part 17 in a direction (LL1, LR1) extending parallel to a first reference direction Ls1 which is defined as one of the directions orthogonal to the center axis line L1 of the opening 15. In more detail, when seen in the direction of the center axis line L1, the first attachment hole 18 is formed to pass through the first attachment wall part 17 in the directions (LL1, LR1) extending parallel to the first reference direction Ls1 at respective positions spaced apart from the center axis line L1 of the opening 15 (shown by two-dot chain lines) by a predetermined offset distance D on one side and on the other side along a direction orthogonal to the first reference direction Ls1. Namely, a pair of the first attachment holes 18 are formed. The direction LL1, LR1 is referred to as attachment-hole extension direction LL1, LR1 herebelow.

The first reference direction Ls1 may be defined as any one of the directions orthogonal to the center axis line L1 of the opening 15. In this embodiment, as shown in FIGS. 1 to 3, among the directions orthogonal to the center axis line L1 of the opening 15, the first reference direction Ls1 is defined as a direction in which the first port 11 and the second port 12 extend collinearly. This is advantageous in that the direction of the first attachment hole 18 (extension direction or passing-through direction) can be checked visually based on the direction in which the first port 11 and the second port 12 extend collinearly.

In addition, in this embodiment, as shown in FIG. 6, a portion of the first attachment wall part 17, through which the attachment-hole extension direction LL1, LR1 runs, extends discontinuously. In other words, the portion of the first attachment wall part 17, through which the attachment-hole extension direction LL1, LR1 runs, is divided into one side part of the attachment-hole extension direction LL1, LR1 and the other side part thereof. Thus, each of the first attachment holes 18 is composed of a front first attachment hole 18A, which is located on the one side of the attachment-hole extension direction LL1, LR1, and a rear first attachment hole 18B, which is located on the other side thereof.

As an alternative example, when the portion of the first attachment wall part 17, through which the attachment-hole extension direction LL1, LR1 runs, extends continuously, each first attachment hole 18 may be formed to extend continuously. In this embodiment, each of the pair of first attachment holes 18 is formed on one side and the other side with respect to the center axis line L1 of the opening 15. However, the number of the first attachment holes 18 may be one, or three or more. In addition, it is not necessary that the first attachment holes 18 are formed in the attachment-hole extension directions LL1 and LR1 shown in the drawings.

(Diaphragm)

Next, the diaphragm 20 is described. As shown in FIGS. 3 to 5, the diaphragm 20 serving as a valve disc member can be brought into contact with or separated from the valve seat 14 in a state where it is placed on the inside seal part 16A. The diaphragm 20 is formed of an elastic material, and has a cylindrical main valve disc part 21 with a bottom, which is disposed to be opposed to the valve seat 14, and a membrane part 22 protruding from an outer circumferential surface of the main valve disc part 21. In the below description of the diaphragm 20, a direction along which a center axis line X1 of the main valve disc part 21 shown in FIG. 7 extends is referred to simply as axial direction/axial/axially, and a direction orthogonal to the center axis line X1 is referred to simply as radial direction/radial/radially. In FIG. 7, hatching lines are omitted for the convenience of description. FIG. 7 is a sectional view of the diaphragm 20 when the diaphragm 20 is cut along a plane including the axial direction and the radial direction.

In view of FIG. 7, the main valve disc part 21 of the diaphragm 20 in this embodiment has a cylindrical circumferential wall 211, a bottom wall 212 which closes the circumferential wall 211 from one axial side (lower side of FIG. 7), and an annular support part 213 protruding radially inside from an inner circumferential surface of an end of the circumferential wall 211 on the other axial side (upper side of FIG. 7). An inner circumferential surface of the support part 213 forms an opening 214 which opens the circumferential surface 211 to the other axial side.

A coupling part 215 is formed between the support part 213 and the bottom wall 212. A distal end of a shaft part 32 of an actuator body 31 of the drive unit 30, which is described later, is coupled to the coupling part 215. The diaphragm 210 is disposed such that its center axis line X1 is coaxial with the center axis line L1 of the opening 15 and the shaft part 32. The diaphragm 20 is configured to be coupled to the shaft part 32, in a state where the shaft part 32, which is is axially reciprocated by the drive unit 30, is received in the coupling part 215 formed inside from the opening 214. In addition, a contact surface 216 to be in contact with the valve seat 14 is formed on an outer surface of the bottom wall 212, which faces the one axial side (lower side of FIG. 7). The contact surface 216 is formed as a flat surface.

On the other hand, the membrane part 22 has an annular shape and protrudes from an outer circumferential surface of the main valve disc part 21. The membrane part 22 has an annular outer circumferential portion 221 located on the outer circumferential side, and an annular inner circumferential portion 222 located on the inner circumferential side. The outer circumferential portion 221 is sandwiched between the valve body 10 on which the valve seat 14 is formed, and a case 33 described later. The case 33 constitutes a part of the drive unit 30, and is attached to the valve body 10 while it covers the shaft part 32. The inner circumferential portion 22 is located between the outer circumferential portion 221 and the main valve disc part 21 to couple the outer circumferential portion 221 and the main valve disc part 21.

As shown in FIG. 5, the diaphragm 20 is coupled to the distal end of the shaft part 32 of the drive unit 30 by the coupling part 215. The outer circumferential portion 221 of the diaphragm 20 is sandwiched between the valve body 10 and the case 33 of the drive unit 30. In this state, by moving the shaft part 32 coupled to the coupling part 215, the diaphragm 20 is brought into contact with or separated from the valve seat 14. When the diaphragm 20 is separated from the valve seat 14, the valve seat 14 is opened so that the first port 11 and the second port 12 are communicated with each other. On the other hand, when the diaphragm 20 is brought into contact with the valve seat 14, the valve seat 14 is closed so that the first port 11 and the second port 12 are disconnected from each other.

The shape of the diaphragm 20 is described further in detail below. An annular groove 223 is formed in the inner circumferential portion 222 of the membrane part 22 in this embodiment. The groove 223 is concaved to the other axial side (upper side of FIG. 7) from a boundary between the inner circumferential portion 222 and the outer circumferential portion 221 on the one axial side (lower side of FIG. 7) and a boundary between the inner circumferential portion 222 and the main valve disc part 21, and extends entirely in the circumferential direction. A sectional shape of the groove 223 when it is cut along a plane extending in the axial direction (in other words, an axial sectional shape of the groove 223) is arcuate, in detail, semicircular. However, the sectional shape of the groove 223 is not limited to the arcuate shape forming a semicircle, but may be an arcuate shape having a central angle less than 90 degrees. In addition, the sectional shape of the arcuate groove 23 may be either along a perfect circular arc or along an elliptical arc.

When a width which is a distance between both edges of the arcuate portion of the groove 223 in the axial section is represented as W, and a depth of the groove 223 is represented as D, D/W is preferably between $1/3$ or more and $1/2$ or less. In this embodiment, since the groove 223 has a semicircular section, D/W is $1/2$.

In addition, the surface of the inner circumferential portion 222 and the surface of the outer circumferential portion 221, which face the other axial side (upper side of FIG. 7) are coplanar flat surfaces. A portion of the inner circumferential portion 222, which faces the other axial side and is closer to the main valve disc part 21, defines an arcuate surface to smoothly connect to the outer circumferential surface of the main valve disc part 21.

In addition, an axial thickness T1 of the outer circumferential portion 221 is between $2/5$ or more and $3/5$ or less of an axial thickness T0 of the main valve disc part 21. In addition, a minimum axial thickness T2 of the inner circumferential portion 222 is between $1/4$ or more and $1/3$ or less of the thickness T1 of the outer circumferential portion 221. Values of T0 to T2 are not particularly limited. For example, the thickness T0 of the main valve disc part 21 may be between 2.5 mm or more and 5 mm or less.

In this embodiment, an inner circumferential edge 222A (i.e., radially inside edge portion) of the inner circumferential portion 222, which is shown by dotted lines in FIG. 7, is connected to a portion of the outer circumferential surface of the circumferential wall 211, which includes an axial midpoint C1. In addition, in this embodiment, an axial midpoint C2 between the support part 213 and the bottom wall 212 is located between both axial ends of the inner circumferential edge 222A of the inner circumferential portion 222.

Moreover, the surface of the outer circumferential portion 221, which faces the one axial side (lower side of FIG. 7), is located between positions on one axial side and the other axial side, which are apart from the contact surface 216 of the main valve disc part 21, which faces the one axial side, by a distance of $3/20$ of the thickness T1 of the outer circumferential portion 221.

On the other hand, a radial dimension D2 from the inner circumferential edge 222A of the inner circumferential portion 222 to an outer circumferential edge 221B of the inner circumferential portion, which is shown by dotted lines in FIG. 7, is between $5/10$ or more and $7/10$ or less of a radial dimension D1 from an inner circumferential edge 221A of the outer circumferential portion 221 to an outer circumferential edge 221B thereof. In addition, a radius D0 of the main valve disc part 21 is preferably between $1/2$ or more and twice or less of a radial dimension D3 (D1+D2) from the inner circumferential edge 222A of the inner circumferential portion 222 to the outer circumferential edge 221B of the outer circumferential print 221. In this embodiment, the dimension D2 is $6/10$ of the dimension D1. The radius D0 is $7/8$ of the dimension D3.

(Drive Unit)

Next, the drive unit 30 is described. As shown in FIG. 3, the drive unit 30 has an actuator body 31 which is a drive part having a reciprocable shaft part 32 coupled to the diaphragm 20, and a case 33 which houses the actuator body 31 and is disposed to cover the opening 15 of the aforementioned valve body 10. The drive unit 30 is configured to switch communication and disconnection between the first port 11 and the second port 12 by bringing the diaphragm 20 into contact with or separating from the valve seat 14 by means of the shaft part 32.

The drive unit 30 in this embodiment is a solenoid. The actuator body 31 is housed in the cylindrical case 33. One axial end of the case 33 has a case-side opening 33A from which the shaft part 32 can be extended outside. The actuator 31 has a bobbin 34 housed in the case 33 to be coaxial with the case 33. An electromagnetic coil 35 is wound around the bobbin 34. A fixed iron core 36 and the aforementioned shaft part 32 (plunger) are housed in an inner circumferential side of the bobbin 34.

The fixed iron core 36 is fixed to be relatively unmovable with respect to the bobbin 34 and the case 33, at a portion opposite to the case-side opening 33A on the inner circumferential side of the bobbin 34. On the other hand, the shaft part 32 is reciprocally housed in the case-side opening 33A side portion in the inner circumferential side of the bobbin 34, with its distal end extending outside from the case-side opening 33A. A spring 32S is disposed between the fixed iron core 36 and the shaft part 32. An engagement part 32A to be coupled to the aforementioned coupling part 215 of the diaphragm 20 is formed on a distal end of the shaft part 32.

A symbol L2 in the drawings depicts a center axis line of the shaft part 32. The shaft part 32 is reciprocated (moved forward and backward) along the center axis line L2. When the electromagnetic coil 35 is supplied with a current, the shaft part 32 is moved backward to the fixed iron core 36. In this state, an urging force in the forward direction is given to the shaft part 32 from the spring 32S. Thus, when the supply of the current to the electromagnetic coil 35 is stopped, the shaft part 32 is moved forward to the valve seat 14. A symbol 33B in the drawings depicts a connector. By connecting a cable to the connector 33B, a current can be supplied to the electromagnetic coil 35. The connector 33B projects circumferentially outside from the case 33.

As shown in FIGS. 3 and 5, a second attachment wall part 37 is formed on an end of the case 33 on the opening 15 side. The second attachment wall part 37 projects to surround the shaft part 32, and is disposed on the inner circumferential side of the first attachment wall part 17. Namely, the case 33 has a cylindrical case body 330 having, in one end thereof, the aforementioned case-side opening 33A through which the shaft part 32 passes, and the second attachment wall part 37. The second attachment wall part 37 stands up from an outer circumferential edge of the case-side opening 33A, and is apart from a circumferential wall of the case body 330 to the case-side opening 33A side.

In this embodiment, the second attachment wall part 37 is formed to surround the entire circumference of the shaft part 32. When seen in the center axis line L2 of the shaft part 32, an outer circumferential surface of the second attachment wall part 37 has a circular shape which can be inserted in the first attachment wall part 17 on the inner circumferential side (see FIG. 6). The second attachment wall part 37 has a first attachment hole 38 through which the aforementioned pin member 40 is inserted.

As shown in FIG. 5, the second attachment wall part 37 in this embodiment has a base part 37A which projects from the case body 330, and a resilient-body contact part 37B provided on a portion of the base part 37A, which is opposed to the inner seal part 16A. A distal end of the base part 37A is opposed to the inner seal part 16A and the outer seal part 16B of the valve body 10. The resilient-body contact part 37B projects toward the inner seal part 16A. The resilient-body contact part 37B has an annular shape, and is formed separately from the base part 37A. The resilient-body contact part 37B is in contact with the outer circumferential portion 221 of the membrane part 22 of the diaphragm 22. Thus, in this embodiment, the outer circumferential portion 221 of the membrane part 22 of the diaphragm 20 is sandwiched between the resilient-body contact part 37B and the inner seal part 16A. In addition, the aforementioned attachment hole 38 is formed in the base part 37A.

As shown in FIGS. 3 and 5, in this embodiment, an intermediate cylindrical part 39 of the bobbin 34 is in contact with an inner circumferential portion of the base part 37A. The bobbin 34 has a cylindrical portion around which the electromagnetic coil 35 is wound, a first flange part radially protruding from an outer circumferential surface of an end of the cylindrical portion on the case-side opening 33A side, a second flange part radially protruding from an outer circumferential surface of an end opposed to the end of the cylindrical portion on the case-side opening 33A side, and the aforementioned intermediate cylindrical part 39 axially projecting from an inner circumferential portion of the first flange part. Here, the inner circumferential portion of the base part 37A protrudes radially inside the case-side opening 33A, and the intermediate cylindrical part 39 is in contact with this protruding portion. Thus, the intermediate cylindrical part 39 is in contact with the inner circumferential portion of the base part 37A through the case-side opening 33A. The outer circumferential portion 221 of the membrane part 22 of the diaphragm 20 is located on an axial extension line of the intermediate cylindrical part 39. However, the inner circumferential portion of the base part 37A may not protrude radially inside the base-side opening 33A. In this case, the intermediate cylindrical part 39 is in contact with the inner circumferential portion of the base part 37A through an outer circumferential edge on an inner surface side of the case-side opening 33A of the case body 330.

Next, the second attachment hole 38 is described with reference to FIG. 6. As shown in FIG. 6, in this embodiment, the second attachment hole 38 is formed to pass though the second attachment wall part 37 in a direction (LL2, LR2) extending parallel to a second reference direction Ls2 which is defined as one of the directions orthogonal to the center axis line L2 of the shaft part 32. In more detail, when seen in the direction of the center axis line L2, similarly to the first attachment hole 18, the second attachment hole 38 is formed to pass through the second attachment wall part 37 in the directions (LL2, LR2) extending parallel to the second reference direction Ls2 at respective positions spaced apart from the center axis line L2 of the shaft part 32 by a predetermined offset distance D on one side and on the other side along a direction orthogonal to the second reference direction Ls2. Namely, a pair of the second attachment holes 38 are formed. Herebelow, the direction LL2, LR2 is referred to as attachment-hole extension direction LL2, LR2 herebelow. In FIG. 6, since the second reference direction Ls2 and the first reference direction Ls1 overlap with each other, they are shown collinearly. Since the attachment-hole extension direction LL2 and the attachment-hole extension direction LR2 overlap with each other, they are shown collinearly. Since the attachment-hole extension direction LR2 and the attachment-hole extension direction LR1 overlap with each other, they are shown collinearly.

The second reference direction Ls2 can be defined as any one of directions orthogonal to the center axis line L2 of the shaft part 32. In this embodiment, for example, the second reference line Ls2 is defined as a direction along which the connector 33B provided on the case 33 projects, among directions orthogonal to the center axis line L2 of the shaft part 32. This is advantageous in that the direction of the second attachment hole 38 (extension direction or passing-through direction) can be checked visually based on the connector 33B.

In this embodiment, as shown in FIG. 6, a portion of the second attachment wall part 37, through which the attachment-hole extension direction LL2, LR2 runs, extends continuously. Thus, each of the second attachment holes 38 extends continuously in the attachment-hole extension direction LL2, LR2. The second attachment hole 38 is formed so as not to communicate with an inner space of the second attachment wall part 37. In this embodiment, each of the second attachment holes 38 passes through the second attachment wall part 37 along the attachment-hole extension direction LL2, LR2, and also opens to the outer circumferential side (radially). Namely, when seen in the attachment-hole extension direction LL2, LR2, the second attachment hole 38 has a U-shape which opens outside.

In this embodiment, when the drive unit 30 is attached to the valve body 10, the second attachment wall part 37 is disposed on the inner circumferential side of the first attachment wall part 17, and the center axis line L2 of the shaft part 32 is collinear with the center axis line L1 of the opening 15. In this state, the pin member 40 is inserted to the first attachment hole 18 and the second attachment hole 38, so that the drive unit 30 is attached to the valve body 10.

At this time, as shown in FIG. 6, the first attachment hole 18 is formed to pass through the first attachment wall part 17 in the directions LL1 and LR1 extending parallel to the first reference direction Ls1 at respective positions spaced apart from the center axis line L1 of the opening 15 by a predetermined offset distance D on one side and on the other side along a direction orthogonal to the first reference direction Ls1. In addition, the second attachment hole 38 is formed to pass through the second attachment wall part 37 in the directions LL2 and LR2 extending parallel to the second reference direction Ls2 at respective positions spaced apart from the center axis line L2 of the shaft part 32 by a predetermined offset distance D on one side and on the other side along a direction orthogonal to the second reference direction Ls2. Thus, when the first attachment hole 18 and the second attachment hole 38 are oriented in the same direction, they can overlap with each other. Then, the pin member 40 can be inserted to the first attachment hole 18 and the second attachment hole 38.

Here, in this embodiment, when the drive unit 30 is pushed to the valve body 10, the resilient-body contact part 37B of the second attachment wall part 37 compresses the outer circumferential portion 221 of the membrane part 22 of the diaphragm 20 to the inner seal part 16A by a predetermined distance. In this state, the first attachment hole 18 and the second attachment hole 38 overlap with each other such that the pin member 40 can be inserted thereto.

Namely, in this embodiment, when the drive unit 30 is not pushed to the valve body 10, the second attachment wall part 37 may be disposed on the inner circumferential side of the first attachment wall part 17, and the resilient-body contact part 37B of the second attachment wall part 37 may be in contact with the outer circumferential portion 221 of the membrane part 22 of the diaphragm 20. In this state, the first attachment hole 18 and the second attachment hole 38 do not overlap with each other such that the pin member 40 can be inserted thereto. On the other hand, when the drive unit 30 is pushed to the valve body 10 from this state, the resilient-body contact part 37B of the second attachment wall part 37 compresses the outer circumferential portion 221 of the membrane part 22 of the diaphragm 20 to the inner seal part 16A (valve body 10) by a predetermined distance. In this state, the first attachment hole 18 and the second attachment hole 38 overlap with each other such that the pin member 40 can be inserted thereto. Thus, in this embodiment, in a state where the drive unit 30 is pushed to the valve body 10 and the first attachment hole 18 and the second attachment hole 38 overlap with each other such that the pin member 40 can be instead thereto, the pin member 40 is inserted to the first attachment hole 18 and the second attachment hole 38.

In this case, by releasing the state where the drive unit 30 is pushed to the valve body 10 after the pin member 40 has been inserted, the compressed outer circumferential portion 221 of the membrane part 22 urges the case 33 of the drive unit 30 in a direction away from the valve body 10, so that the pin member 40 is pressed onto the inner circumferential surface of the first attachment hole 18. Thus, the pin member 40 is prevented from escaping from the first attachment hole 18 and the second attachment hole 38. In addition, although the outer circumferential portion of the membrane part 22 restores to a state where the pin member 40 is pressed onto the inner circumferential surface of the first attachment hole 18, the outer circumferential portion is still compressed between the inner seal part 16A and the resilient-body contact part 37B. Thus, airtightness or liquid tightness between the inner seal part 16A and the resilient-body contact part 37B can be well ensured.

Note that, in this embodiment, the intermediate cylindrical part 39 of the bobbin 34 is in contact with the inner circumferential portion of the base part 37A, and the outer circumferential portion 221 of the membrane part 22 of the diaphragm 20 is located on an axial extension line of the intermediate cylindrical part 39. Thus, since a force for pushing the drive unit 30 to the valve body 10 is axially transmitted from the case 33 to the base part 37A and the resilient-body contact part 37B through the intermediate cylindrical part 39 of the bobbin 34, the outer circumferential portion 221 of the membrane part 22 can be easily deformed. Thus, the first attachment hole 18 and the second attachment hole 38 can be easily overlapped with each other such that the pin member 40 can be inserted thereto.

In this embodiment, each of the second attachment holes 38 continuously extends in the attachment-hole extension direction LL2, LR2. However, as a modification example, a portion of the second attachment wall part 37, along which the attachment-hole extension direction LL2, LR2 runs, extends discontinuously. In this case, similarly to the first attachment hole 18, the second attachment hole 38 may be divided. However, in this case, the aforementioned predetermined offset distance D is preferably larger than the radius of the shaft part 32. When the predetermined offset distance D is larger than the radius of the shaft part 32, the movement of the shaft part 32 is not disturbed by the pin member 40 without any special process, which is advantageous.

(Pin Member)

As shown in FIG. 6, the pin member 40 having a U-shape in this embodiment includes a pair of first portions 41 extending parallel to each other, and a second portion 42 connecting ends of the pair of first portions 41. One of the pair of first portions 41 is inserted across the first attachment hole 18 and the second attachment hole 38 which are located on one side with respect to the center axis lines (L1 and L2) of the opening 15 and the shaft part 32. The other of the pair of first portions 41 is inserted across the first attachment hole 18 and the second attachment hole 38 which are located on the other side with respect to the center axis lines (L1 and L2) of the opening 15 and the shaft part 32. In more detail, each of the pair of first portions 41 is inserted from the front first attachment hole 18A of the first attachment hole 18 to reach the rear first attachment hole 18B through the second attachment hole 38.

In more detail, as shown in FIGS. 1 to 3, each of the pair of first portions 41 has an insertion portion 41A to be inserted across the first attachment hole 18 and the second attachment hole 38 which overlap with each other, and an offset portion 41B bent from the insertion portion 41A. The second portion 42 couples ends of the respective offset portions 41B, which are opposed to ends thereof on the insertion portion 41A side.

In this embodiment, as described above, since the compressed outer circumferential portion 221 of the membrane part 22 urges the case 33 of the drive unit 30 in a direction apart from the valve body 10, the respective insertion portions 41A of the first portions 41 of the pin member 40 are pressed onto the inner circumferential surface of the first attachment hole 18. Thus, the respective first portions 41 of the pin member 40 are prevented from escaping from the first attachment hole 18 and the second attachment hole 38. In addition, when the pin member 40 is inserted to the first attachment hole 18 and the second attachment hole 38, the second portion 42 is separated from the insertion portions 41A inserted in the first attachment hole 18 and the second attachment hole 38 on one axial side or on the other axial side of the shaft part 32. In the illustrated example, the second portion 42 is located radially outside of the circumferential wall of the case body 330. When the second portion 42 is located axially outside the case body 330 and radially outside the first attachment wall part 17, it takes time to insert and pull out the pin member 40. On the other hand, as in this embodiment, when the second portion 42 is located radially outside the circumferential wall of the case body 330, it is easy to insert and pull out the pin member 40.

(Attachment Method)

An example of an attachment method of attaching the drive unit 30 to the aforementioned valve body 10 is described herebelow with reference to FIGS. 8 to 13.

Figure 8:
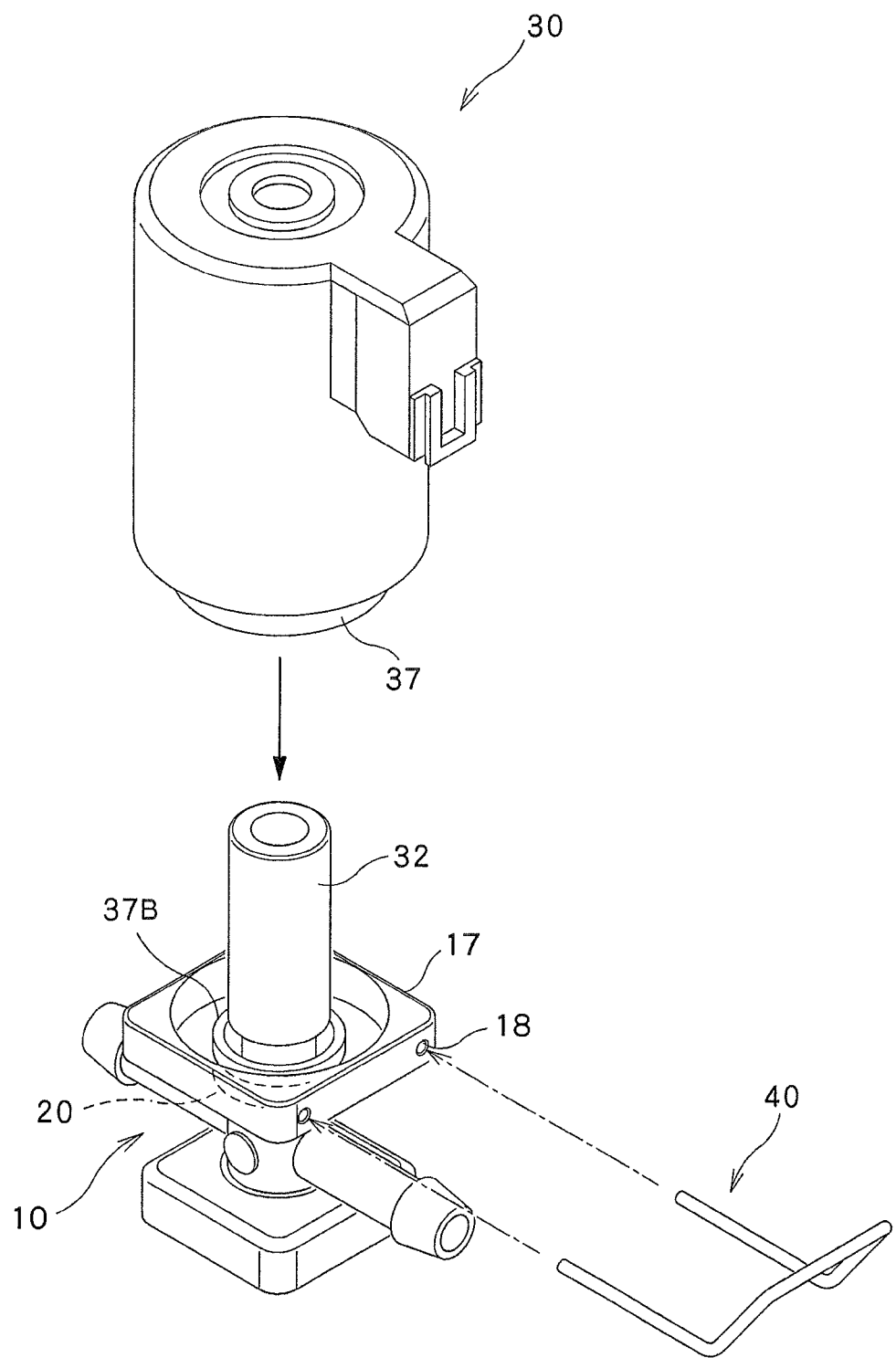
FIG. 8 is a perspective view showing a state where a valve body and a drive unit of the diaphragm valve shown in FIG. 1 are separated from each other.
Figure 9:
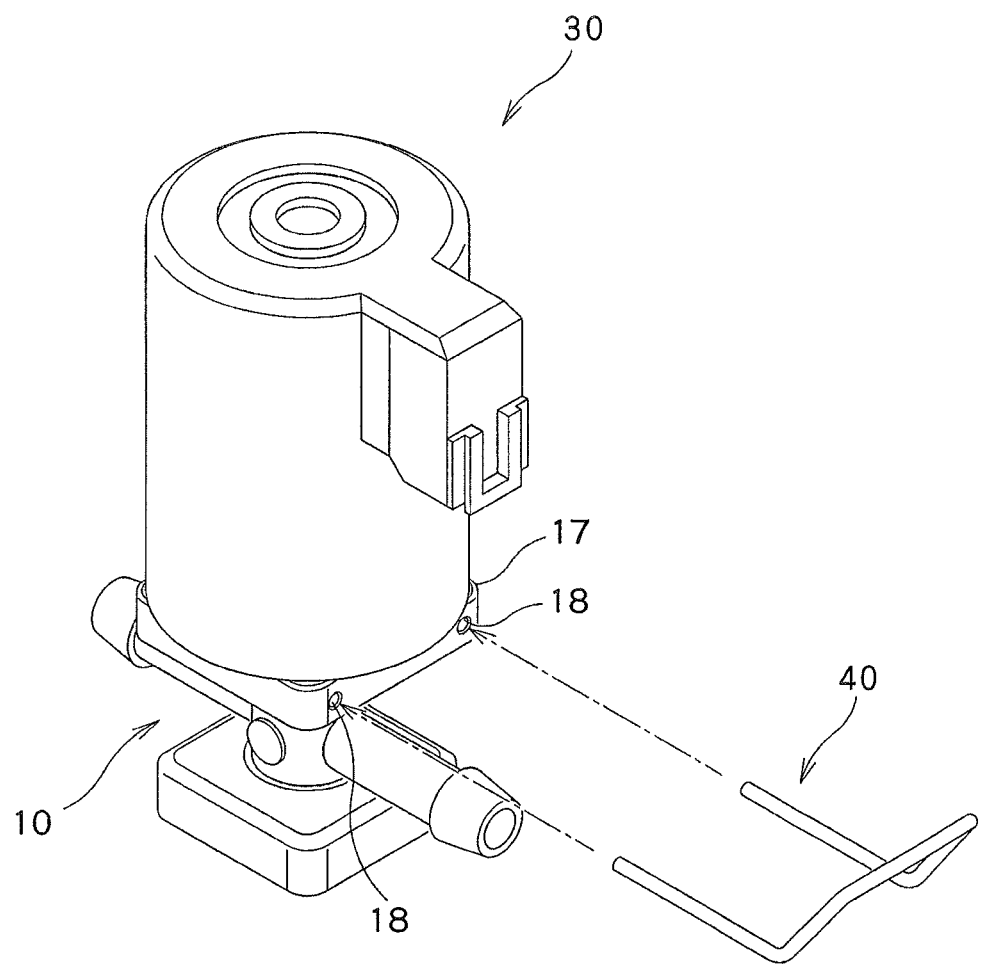
FIG. 9 is a perspective view describing an operation for temporarily assembling the drive unit to the valve body shown in FIG. 8.

FIG. 8 is a perspective view showing a state where the valve body 10 and the drive unit 30 are separated from each other. When the drive unit 30 is attached to the valve body 10, as shown in FIGS. 8 and 9, the drive unit 30 is temporarily assembled to the valve body 10 first. In a temporarily assembled state according to this embodiment, as shown in FIG. 8, the coupling part 215 of the diaphragm 20 is first coupled to the engagement part 32A of the shaft part 32, so that the resilient-body contact part 37B is placed on the diaphragm 20. In this state, the diaphragm 20, the resilient-body contact part 37B and the shaft part 32 are placed on the seal part 16 of the valve body 10. From this state, the second attachment wall part 37 is disposed on the inner circumferential side of the first attachment wall part 17 as shown by an arrow, and the drive unit 30 is placed on the valve body 10 as shown in FIG. 9. In this state, the base part 37A of the second attachment wall part 37 is in contact with the outer circumferential portion 221 of the membrane part 22 of the diaphragm 20 through the resilient-body contact part 37B.

Figure 11:
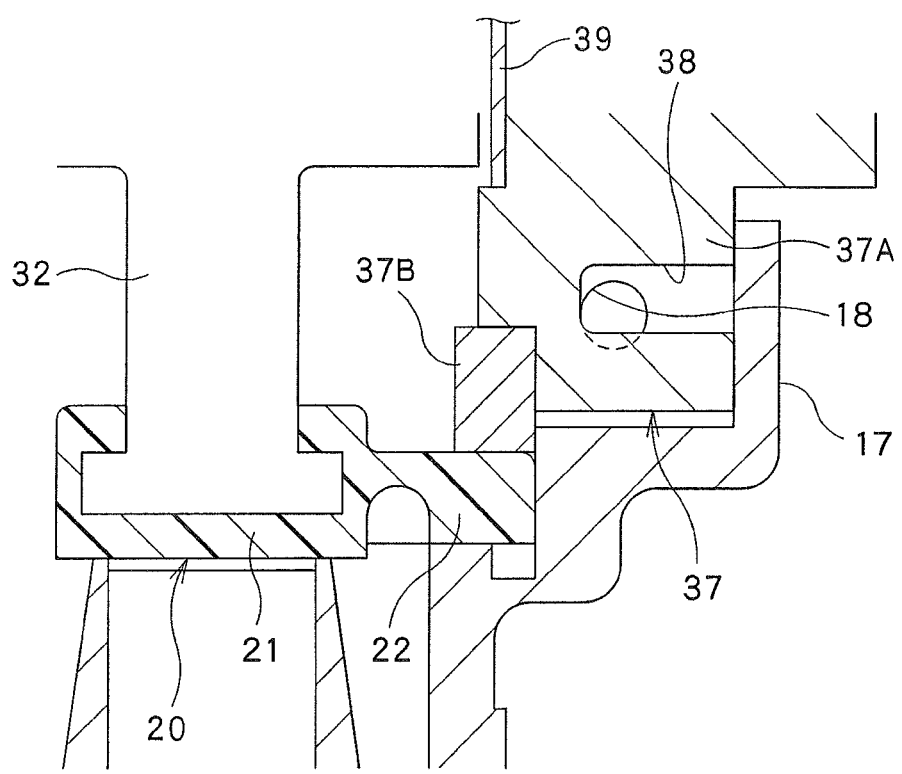
FIG. 11 is a view corresponding to the state shown in FIG. 9, and describing a positional relationship between the attachment holes of the valve body and the drive unit.

The direction of the first attachment hole 18 and the direction of the second attachment hole 38 are visually adjusted to face in the same direction. Here, FIG. 11 is a view corresponding to the state shown in FIG. 9, and describing a positional relationship between the first attachment hole 18 and the second attachment hole 38. As shown in FIG. 11, in this temporarily assembled state, a part of the first attachment hole 18 overlaps with the outer circumferential edge of the second attachment hole 38, and the first attachment hole 18 and the second attachment hole 38 do not overlap with each other such that the pin member 40 can be inserted thereto.

Figure 10:
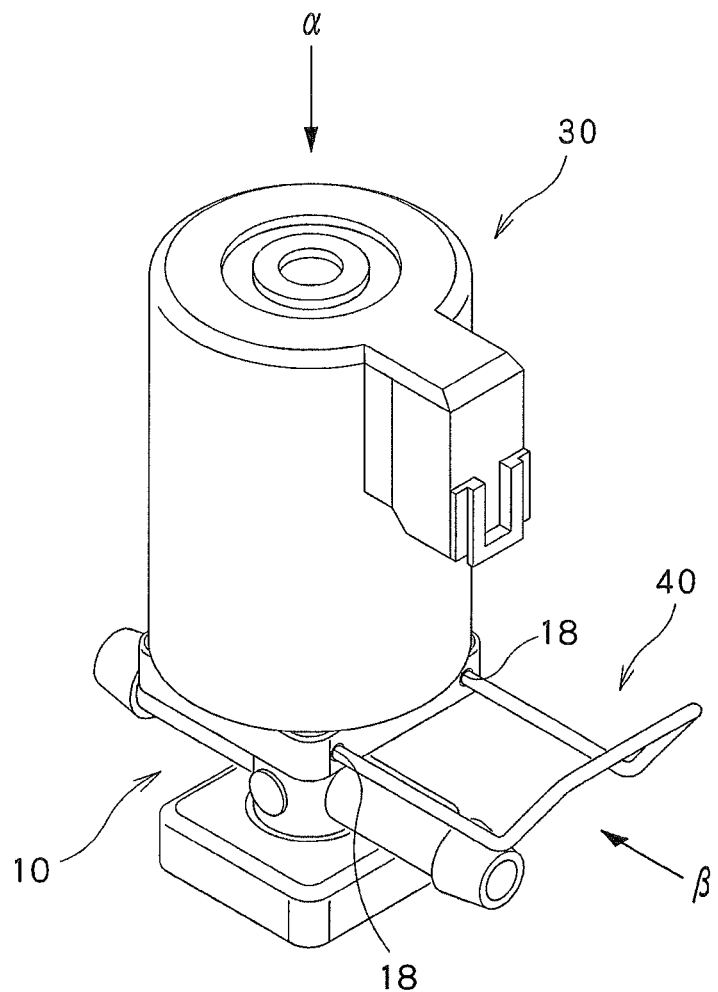
FIG. 10 is a perspective view showing an operation for attaching the drive unit to the valve body by inserting a pin member to an attachment hole formed in the valve body and an attachment hole formed in the drive unit, while pushing the drive unit to the valve body.
Figure 12:
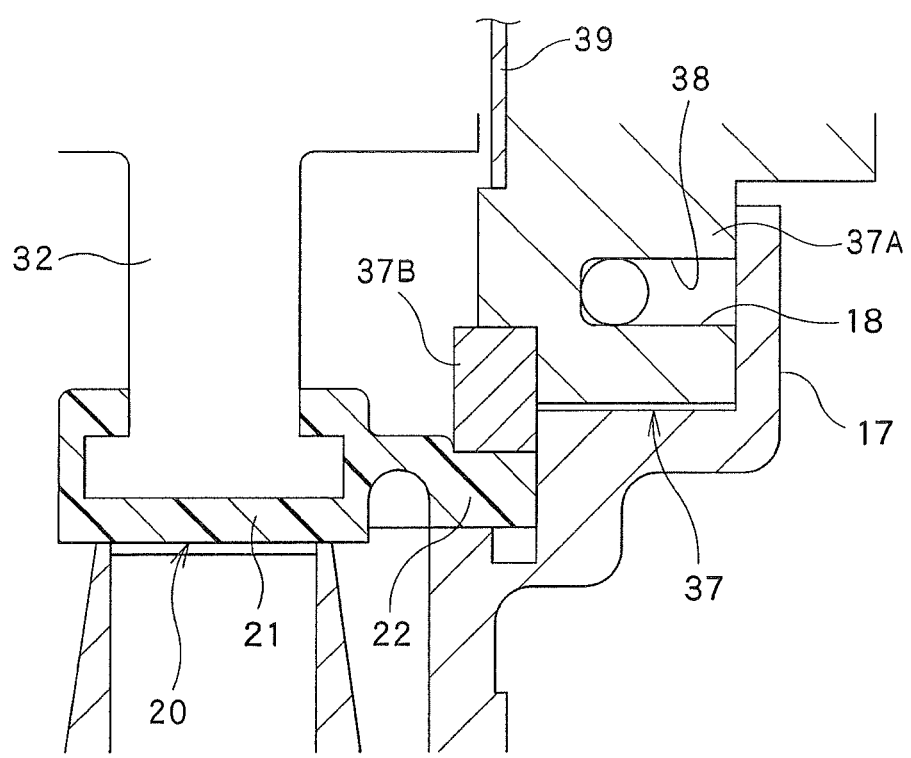
FIG. 12 is a view describing the positional relationship between the attachment holes of the valve body and the drive unit, when the drive unit is pushed to the valve body from the state shown in FIG. 9.

Following thereto, as shown by an arrow a of FIG. 10, the drive unit 30 is pushed to the valve body 10 by a predetermined distance. Thus, the resilient-body contact part 37B of the second attachment wall part 37 compresses the outer circumferential portion 221 of the membrane part 22 of the diaphragm 22 to the inner seal part 16A by a predetermined distance. Thus, the first attachment hole 18 and the second attachment hole 38 overlap with each other such that the pin member 40 can be inserted thereto. FIG. 12 is a view describing the positional relationship between the first attachment hole 18 and the second attachment hole 38, when the drive unit 30 is pushed to the valve body 10 by a predetermined distance from the state shown in FIG. 9. As shown in FIG. 12, in this state, since the first attachment hole 18 has been moved to the valve body 10 by a predetermined distance from the state shown in FIG. 11, the first attachment hole 18 and the second attachment hole 38 overlap with each other such that the pin member 40 can be inserted thereto.

Figure 13:
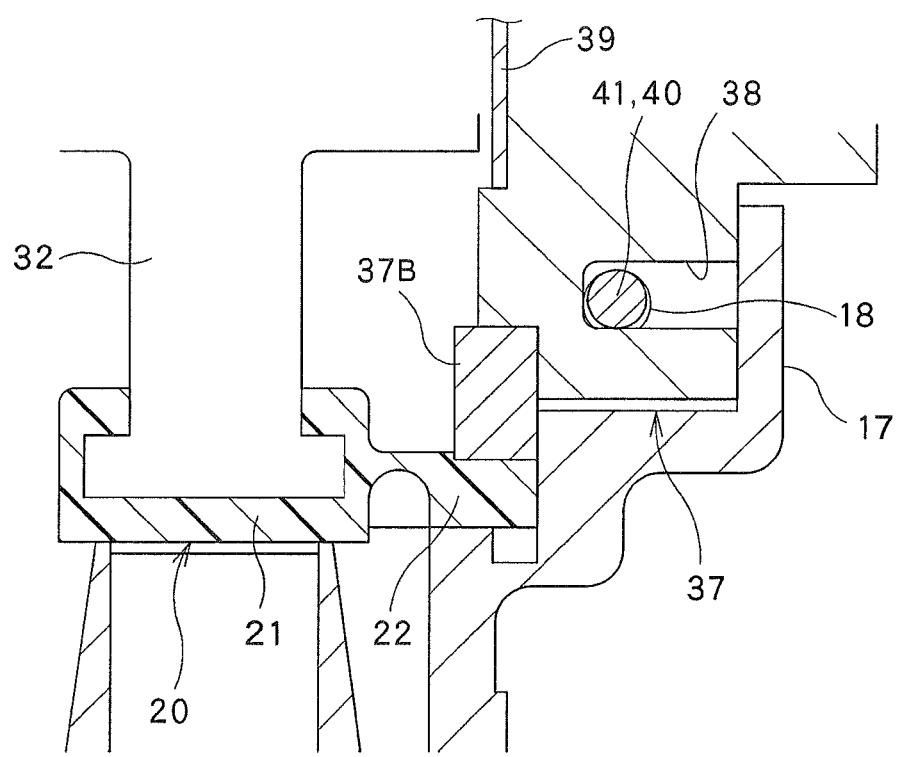
FIG. 13 is a view showing a state in which the pin member has been inserted to the attachment holes of the valve body and the drive unit, from the state of FIG. 12.

In the state where the first attachment hole 18 and the second attachment hole 38 overlap with each other such that the pin member 40 can be inserted thereto, as shown in FIGS. 10 and 13, the respective first portions 41 of the pin member 40 are inserted to the first attachment holes 18 and the second attachment holes 38. Thereafter, by releasing the state where the drive unit 30 is pushed to the valve body 10 after the pin member 40 has been inserted, the compressed outer circumferential portion 221 of the membrane part 22 urges the case 33 of the drive unit 30 in a direction away from the valve body 10, so that the pin member 40 is pressed onto the inner circumferential surface of the first attachment hole 18. Thus, the pin member 40 is prevented from escaping from the first attachment hole 18 and the second attachment hole 38. In addition, although the outer circumferential portion of the membrane part 22 restores to a state where the pin member 40 is pressed onto the inner circumferential surface of the first attachment hole 18, the outer circumferential portion is still compressed between the inner seal part 16A and the resilient-body contact part 37B. Thus, airtightness or liquid tightness between the inner seal part 16A and the resilient-body contact part 37B can be well ensured. In this manner, the drive unit 30 is attached to the valve body 10.

On the other hand, by pulling the pin member 40 out from the first attachment holes 18 and the second attachment holes 38 from this state, the drive unit 30 can be detached from the valve body 10. At this time, by pushing the drive unit 30 to the valve body 10 to loosen or release the state where the respective first portions 41 of the pin member 40 are pressed onto the inner circumferential surface of the first attachment hole 18, the pin member 40 can be smoothly pulled out from the first attachment holes 18 and the second attachment holes 38.

The diaphragm valve 1 according to the aforementioned embodiment utilizes the resiliency of the diaphragm 20 and the pin member 40 inserted across the valve body 10 and the drive unit 30, so that the valve body 10 and the drive unit 30 can be easily coupled to each other without using any tool.

In addition, the shape and the dimensional conditions of the diaphragm 20 are well designed. Thus, the diaphragm 20 can have good sensitivity to the operation of the drive unit 30 and good rigidity to the fluid pressure, while having improved durability as compared with a conventional one (diaphragm of FIG. 14).

In detail, the diaphragm 20 according to this embodiment has the annular groove 223 formed therein, which is concaved from the boundary between the inner circumferential portion 222 and the outer circumferential portion 221 on the one axial side and the boundary between the inner circumferential portion 222 and the main valve disc part 21 to the other axial side, and extends entirely in the circumferential direction. The sectional shape of the groove 223 is arcuate. Since the inner circumferential portion 222 is thinner to have suitable flexibility, good sensitivity to the operation of the drive unit 30 can be ensured. In addition, since the surface of the groove 223 exposed to the fluid pressure is arcuate, the fluid pressure can be dispersed, whereby good rigidity to the fluid pressure can be ensured. In addition, since the surface of the inner circumferential portion 222 and the surface of the outer circumferential portion 221, which face the other axial side, are coplanar, rigidity against deformation of the inner circumferential portion 22 caused by the fluid pressure can be ensured, whereby good rigidity to the fluid pressure can be ensured.

Further, in addition to the aforementioned shape, the inner circumferential edge 222A of the inner circumferential portion 222 is connected to a portion of the outer circumferential surface of the circumferential wall 211, which includes an axial midpoint. In addition, the surface of the outer circumferential portion 221, which faces the one axial side (lower side of FIG. 7), is located between positions on one axial side and the other axial side, which are apart from the contact surface 216 of the main valve disc part 21, which faces the one axial side, by a distance of $3/20$ of the thickness T1 of the outer circumferential portion 221. Furthermore, by defining various dimensional conditions of the thickness and the diameter, a stress when the diaphragm 20 is opened and closed can be reduced, which can improve durability.

Figure 14:
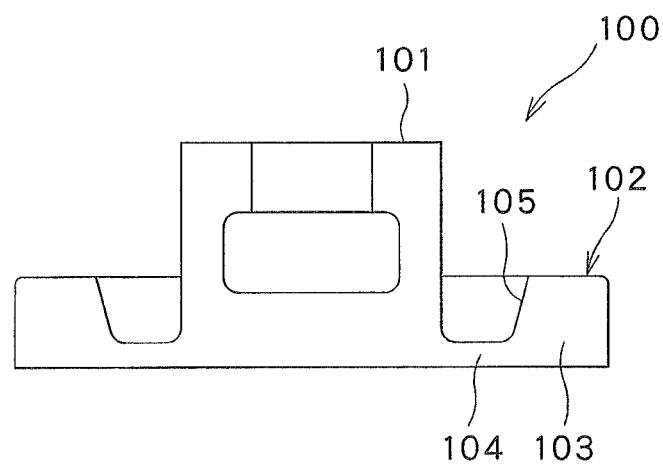
FIG. 14 is a sectional view of a conventional diaphragm.
Figure 15A:
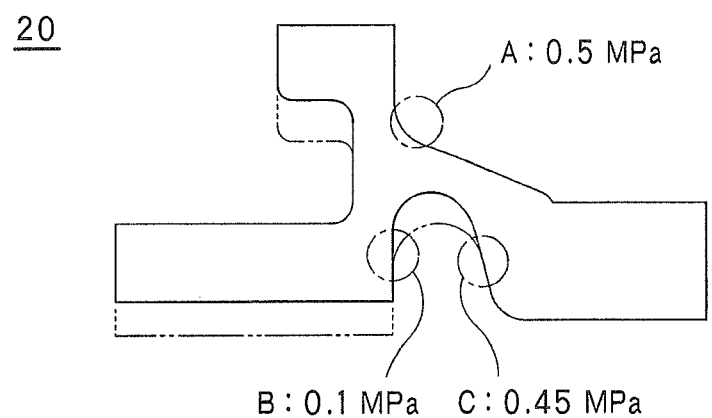
FIG. 15A is a view showing a state in which the diaphragm according to the embodiment is deformed by the drive unit.
Figure 15B:
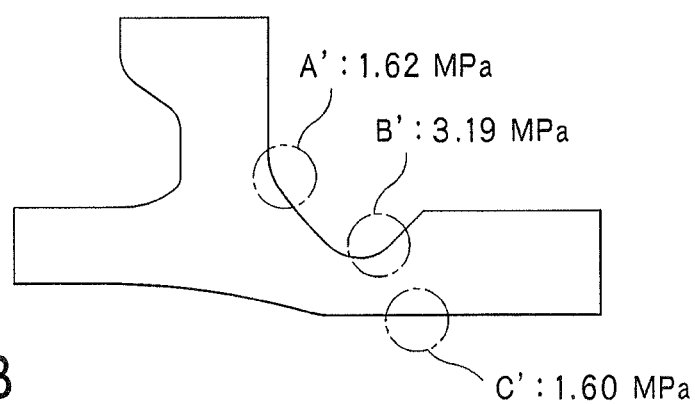
FIG. 15B is a view showing a state in which the conventional diaphragm shown in FIG. 14 is deformed by the drive unit.

FIG. 15A is a view showing a state in which the diaphragm 20 according to this embodiment is deformed by the drive unit 30. FIG. 15B is a view showing a state in which the conventional diaphragm 100 shown in FIG. 14 is deformed by the drive unit. The diaphragm 20 shown in FIG. 15A and the diaphragm 100 shown in FIG. 15B are equivalent to each other in dimensions such as a thickness, a diameter, etc.

According to the analysis of the present inventors, when the diaphragm 20 shown in FIG. 15A was stroked in an opening direction by 0.5 mm, a stress of a portion shown by a symbol A in FIG. 15A was 0.5 MPa, a stress of a portion shown by a symbol B was 0.1 MPa, and a stress of a portion shown by a symbol C was 0.45 MPa. On the other hand, when the conventional diaphragm 100 shown in FIG. 15B was stroked under the same condition, a stress of a portion shown by a symbol A' in FIG. 15A was 1.62 MPa, a stress of a portion shown by a symbol B' was 3.19 MPa, and a stress of a portion shown by a symbol C' was 1.60 MPa. Since a stress in opening and closing of the diaphragm 20 according to this embodiment is reduced, the diaphragm 20 can have improved durability as compared with a conventional one.

The one embodiment described above is shown by way of example, and the present invention is not limited to the embodiment. The aforementioned embodiment may be variously modified.

What is claimed is:

1. A diaphragm for valve comprising:
   a main valve disc part having a cylindrical circumferential wall and a bottom wall that closes the cylindrical circumferential wall from one axial side, wherein an opening that opens the circumferential wall the annular membrane part is formed, the main valve disc part couples to a shaft part that is axially reciprocated by a drive unit in a state where the shaft part is received therein from the opening, and a contact surface to be in contact with a valve seat is formed on an outer surface of the bottom wall, the outer surface facing the one axial side; and
   an annular membrane part radially protruding from an outer circumferential surface of the main valve disc part;

wherein:
   the annular membrane part has an annular outer circumferential portion that is sandwiched between a valve body on which the valve seat is formed and a case that constitutes a part of the drive unit and is attached to the valve body while covering the shaft part, and an annular inner circumferential portion located between the outer circumferential portion and the main valve disc part to couple the outer circumferential portion and the main valve disc part;
   an annular groove is formed in the inner circumferential portion, the annular groove being concaved to the other axial side from a boundary between the inner circumferential portion and the outer circumferential portion on the one axial side and a boundary between the inner circumferential portion and the main valve disc part, and extending entirely in a circumferential direction, with a sectional shape of the groove being arcuate;
   a surface of the inner circumferential portion and a surface of the outer circumferential portion are coplanar and face the other axial side;
   an axial thickness of the outer circumferential portion is between $2/5$ or more and $3/5$ or less of an axial thickness of the main valve disc part;
   a minimum axial thickness of the inner circumferential portion is between $1/4$ or more and $1/3$ or less of the axial thickness of the outer circumferential portion;
   an inner circumferential edge of the inner circumferential portion connects to a portion of an outer circumferential surface of the cylindrical circumferential wall, the portion including an axial midpoint of the outer circumferential surface of the cylindrical circumferential wall;
   a surface of the outer circumferential portion, which faces the one axial side, is located between positions on one axial side and the other axial side, which are apart from the contact surface of the main valve disc part, which faces the one axial side, by a distance of $3/20$ of the thickness of the outer circumferential portion;
   a radial dimension from the inner circumferential edge of the inner circumferential portion to an outer circumferential edge thereof is between $5/10$ or more and $7/10$ or less of a radial dimension from an inner circumferential edge of the outer circumferential portion to an outer circumferential edge thereof; and
   the diaphragm for valve is formed of a resilient material.

2. A diaphragm valve comprising a diaphragm for valve according to claim 1.

3. A diaphragm valve comprising:
   a valve body having a first and a second ports through which a fluid flows, a fluid chamber to which the first port and the second port are connected, and a valve seat formed inside the fluid chamber, wherein an opening for exposing the valve seat to an outside is formed in the fluid chamber;

a diaphragm for valve according to claim 1, the diaphragm for valve being capable of being brought into contact with or separated from the valve seat;

a drive unit that includes a drive part having a reciprocable shaft part to be coupled to the main valve disc part of the diaphragm for valve, and a case that houses the drive part and covers the opening in the fluid chamber, wherein the drive unit switches communication and disconnection between the first port and the second port by bringing the diaphragm for valve into contact with or separating from the valve seat by means of the reciprocable shaft part; and a pin member for attaching the drive unit to the valve body;

wherein:

a seal part is formed on an outer circumferential edge of the opening in the fluid chamber;

a first attachment wall part projecting to surround the opening in the fluid chamber is formed on an outer circumferential-side portion of the seal part;

a second attachment wall part is formed on an end of the case on an opening side, the second attachment wall part projecting to surround the shaft part and being disposed on an inner circumferential side of the first attachment wall part;

a first attachment hole to which the pin member is inserted is formed in the first attachment wall part;

a second attachment hole to which the pin member is inserted is formed in the second attachment wall part;

the drive unit is attached to the valve body by inserting the pin member across the first attachment hole and the second attachment hole;

the outer circumferential portion of the annular membrane part of the diaphragm for valve is sandwiched between the second attachment wall part and the seal part;

the pin member is inserted across the first attachment hole and the second attachment hole in a state where the second attachment wall part compresses the outer circumferential portion between the second attachment wall part and the seal part to the valve body; and the compressed outer circumferential portion urges the case in a direction away from the valve body, so that the pin member is pressed onto an inner circumferential surface of the first attachment hole.

4. The diaphragm valve according to claim 3, wherein:

the case includes a cylindrical case body having, in one end thereof, a case-side opening through which the shaft part passes, and the second attachment wall part, wherein the second attachment wall part stands up from an outer circumferential edge of the case-side opening in the case body and is apart from a circumferential wall of the case body to the case-side opening side;

a pair of the first attachment holes are formed, and a pair of the second attachment holes are formed;

the pin member having a U-shape includes a pair of first portions extending parallel to each other, and a second portion connecting ends of the pair of first portions;

each of the pair of first portions has an insertion portion to be inserted across the respective first attachment hole and the respective second attachment hole which overlap with each other, and an offset portion bent from the insertion portion, wherein the second portion couples ends of the respective offset portions, the ends being opposed to ends thereof on the insertion portion side; and the second portion is separated from the insertion portions inserted in the first attachment holes and the second attachment holes to one axial side or to an other axial side of the shaft part.

5. The diaphragm for valve according to claim 1, wherein the sectional shape of the groove is semicircular.

6. A diaphragm valve comprising a diaphragm for valve according to claim 5.

7. A diaphragm valve comprising:

a valve body having a first and a second ports through which a fluid flows, a fluid chamber to which the first port and the second port are connected, and a valve seat formed inside the fluid chamber, wherein an opening for exposing the valve seat to an outside is formed in the fluid chamber;

a diaphragm for valve according to claim 5, the diaphragm for valve being capable of being brought into contact with or separated from the valve seat;

a drive unit that includes a drive part having a reciprocable shaft part to be coupled to the main valve disc part of the diaphragm for valve, and a case that houses the drive part and covers the opening in the fluid chamber, wherein the drive unit switches communication and disconnection between the first port and the second port by bringing the diaphragm for valve into contact with or separating from the valve seat by means of the reciprocable shaft part; and a pin member for attaching the drive unit to the valve body;

wherein:

a seal part is formed on an outer circumferential edge of the opening in the fluid chamber;

a first attachment wall part projecting to surround the opening in the fluid chamber is formed on an outer circumferential-side portion of the seal part;

a second attachment wall part is formed on an end of the case on an opening side, the second attachment wall part projecting to surround the shaft part and being disposed on an inner circumferential side of the first attachment wall part;

a first attachment hole to which the pin member is inserted is formed in the first attachment wall part;

a second attachment hole to which the pin member is inserted is formed in the second attachment wall part;

the drive unit is attached to the valve body by inserting the pin member across the first attachment hole and the second attachment hole;

the outer circumferential portion of the annular membrane part of the diaphragm for valve is sandwiched between the second attachment wall part and the seal part;

the pin member is inserted across the first attachment hole and the second attachment hole in a state where the second attachment wall part compresses the outer circumferential portion between the second attachment wall part and the seal part to the valve body; and the compressed outer circumferential portion urges the case in a direction away from the valve body, so that the pin member is pressed onto an inner circumferential surface of the first attachment hole.

8. The diaphragm for valve according to claim 1, wherein the main valve disc part further has an annular support part protruding radially inside from an inner circumferential surface of an end of the cylindrical circumferential wall on the other axial side, and an axial midpoint between the annular support part and the bottom wall is located between both axial ends of the inner circumferential edge of the inner circumferential portion.

9. The diaphragm for valve according to claim 8, wherein the sectional shape of the groove is semicircular.

10. A diaphragm valve comprising a diaphragm for valve according to claim 8.

11. A diaphragm valve comprising:
a valve body having a first and a second ports through which a fluid flows, a fluid chamber to which the first port and the second port are connected, and a valve seat formed inside the fluid chamber, wherein an opening for exposing the valve seat to an outside is formed in the fluid chamber;
a diaphragm for valve according to claim 8, the diaphragm for valve being capable of being brought into contact with or separated from the valve seat;
a drive unit that includes a drive part having a reciprocable shaft part to be coupled to the main valve disc part of the diaphragm for valve, and a case that houses the drive part and covers the opening in the fluid chamber, wherein the drive unit switches communication and disconnection between the first port and the second port by bringing the diaphragm for valve into contact with or separating from the valve seat by means of the reciprocable shaft part; and
a pin member for attaching the drive unit to the valve body;
wherein:
a seal part is formed on an outer circumferential edge of the opening in the fluid chamber;
a first attachment wall part projecting to surround the opening in the fluid chamber is formed on an outer circumferential-side portion of the seal part;
a second attachment wall part is formed on an end of the case on an opening side, the second attachment wall part projecting to surround the shaft part and being disposed on an inner circumferential side of the first attachment wall part;
a first attachment hole to which the pin member is inserted is formed in the first attachment wall part;
a second attachment hole to which the pin member is inserted is formed in the second attachment wall part;
the drive unit is attached to the valve body by inserting the pin member across the first attachment hole and the second attachment hole;
the outer circumferential portion of the annular membrane part of the diaphragm for valve is sandwiched between the second attachment wall part and the seal part;
the pin member is inserted across the first attachment hole and the second attachment hole in a state where the second attachment wall part compresses the outer circumferential portion between the second attachment wall part and the seal part to the valve body; and
the compressed outer circumferential portion urges the case in a direction away from the valve body, so that the pin member is pressed onto an inner circumferential surface of the first attachment hole.

12. The diaphragm for valve according to claim 1, wherein
a radius of the main valve disc part is between ½ or more and twice or less of a radial dimension from the inner circumferential edge of the inner circumferential portion to the outer circumferential edge of the outer circumferential portion.

13. The diaphragm for valve according to claim 12, wherein
the main valve disc part further has an annular support part protruding radially inside from an inner circumferential surface of an end of the cylindrical circumferential wall on the other axial side, and
an axial midpoint between the annular support part and the bottom wall is located between both axial ends of the inner circumferential edge of the inner circumferential portion.

14. The diaphragm for valve according to claim 12, wherein
the sectional shape of the groove is semicircular.

15. A diaphragm valve comprising a diaphragm for valve according to claim 12.

16. A diaphragm valve comprising:
a valve body having a first and a second ports through which a fluid flows, a fluid chamber to which the first port and the second port are connected, and a valve seat formed inside the fluid chamber, wherein an opening for exposing the valve seat to an outside is formed in the fluid chamber;
a diaphragm for valve according to claim 12, the diaphragm for valve being capable of being brought into contact with or separated from the valve seat;
a drive unit that includes a drive part having a reciprocable shaft part to be coupled to the main valve disc part of the diaphragm for valve, and a case that houses the drive part and covers the opening in the fluid chamber, wherein the drive unit switches communication and disconnection between the first port and the second port by bringing the diaphragm for valve into contact with or separating from the valve seat by means of the reciprocable shaft part; and
a pin member for attaching the drive unit to the valve body;
wherein:
a seal part is formed on an outer circumferential edge of the opening in the fluid chamber;
a first attachment wall part projecting to surround the opening in the fluid chamber is formed on an outer circumferential-side portion of the seal part;
a second attachment wall part is formed on an end of the case on an opening side, the second attachment wall part projecting to surround the shaft part and being disposed on an inner circumferential side of the first attachment wall part;
a first attachment hole to which the pin member is inserted is formed in the first attachment wall part;
a second attachment hole to which the pin member is inserted is formed in the second attachment wall part;
the drive unit is attached to the valve body by inserting the pin member across the first attachment hole and the second attachment hole;
the outer circumferential portion of the annular membrane part of the diaphragm for valve is sandwiched between the second attachment wall part and the seal part;
the pin member is inserted across the first attachment hole and the second attachment hole in a state where the second attachment wall part compresses the outer circumferential portion between the second attachment wall part and the seal part to the valve body; and
the compressed outer circumferential portion urges the case in a direction away from the valve body, so that the pin member is pressed onto an inner circumferential surface of the first attachment hole.

* * * * *